(12) United States Patent
Lei et al.

(10) Patent No.: US 11,997,169 B2
(45) Date of Patent: May 28, 2024

(54) METHOD FOR ACTIVATING EDGE SERVERS

(71) Applicant: Lenovo (Beijing) Limited, Beijing (CN)

(72) Inventors: Ming Lei, Beijing (CN); Haijun Xu, Beijing (CN); Zhipeng Gao, Beijing (CN); Da Li, Beijing (CN); Shaohua Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/240,634

(22) Filed: Aug. 31, 2023

(65) Prior Publication Data

US 2024/0073287 A1    Feb. 29, 2024

(30) Foreign Application Priority Data

Aug. 31, 2022  (CN) .......................... 202211065882.0

(51) Int. Cl.
| | | |
|---|---|---|
| *H04L 67/141* | (2022.01) | |
| *H04L 9/30* | (2006.01) | |
| *H04L 9/32* | (2006.01) | |
| *H04L 67/10* | (2022.01) | |

(52) U.S. Cl.
CPC .............. *H04L 67/141* (2013.01); *H04L 9/30* (2013.01); *H04L 9/3213* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2019/0089729 A1* | 3/2019 | Nishi | H04L 63/10 |
| 2019/0363961 A1* | 11/2019 | Lemmons | H04L 43/50 |
| 2023/0026671 A1* | 1/2023 | Seed | H04W 36/32 |
| 2023/0254211 A1* | 8/2023 | Sodagar | H04L 41/0886 |
| 2023/0319118 A1* | 10/2023 | Sodagar | H04L 65/1063 |

* cited by examiner

*Primary Examiner* — Quang N Nguyen
(74) *Attorney, Agent, or Firm* — ANOVA LAW GROUP, PLLC

(57) ABSTRACT

Embodiments of the present disclosure provide a method for activating at least a first edge server and a second edge server. The first edge server includes a first service processor, and the second edge server includes a second service processor. The method includes establishing a data communication connection between the first service processor and the second service processor, establishing a data communication connection between the first service processor and a specified website, establishing a trusted communication between the first service processor and the specified website, establishing a trusted communication between the first service processor and the second service processor, obtaining an activation right from the specified website by the first service processor, and performing the activation right to activate the first edge server and the second edge server by the first service processor.

14 Claims, 2 Drawing Sheets

METHOD FOR ACTIVATING EDGE SERVERS

CROSS-REFERENCE TO RELATED APPLICATION

The present disclosure claims priority to Chinese Patent Application No. 202211065882.0, filed on Aug. 31, 2022, the entire content of which is incorporated herein by reference.

TECHNICAL FIELD

The present disclosure relates to the method for activating a plurality of edge servers and, more particularly, to a method for activating the plurality of edge servers in a same local network.

BACKGROUND

More and more edge servers are deployed on the market. However, since an environment using an edge server is relatively fragile, the edge server is normally in a locked state during transportation. Thus, the edge server needs to be activated for use.

For many clients, activating the edge server is inconvenient, because a general edge station cannot be directly connected to a relevant website (e.g., Lenovo ThinkShield Portal) through a mobile network (e.g., Internet), and activation functions provided by the relevant website cannot be used. Thus, some clients need to use a mobile phone application to activate the edge server, and some other clients need to activate the edge server manually. However, no matter activating the edger server by using the mobile phone application or manually, the edge servers need to be activated one by one, which is time-consuming and labor-intensive.

Therefore, the purpose of the present disclosure is to provide a method for activating at least two edge servers and a multi-server system to eliminate the above problem and provide a replacement solution.

SUMMARY

Embodiments of the present disclosure provide a method for activating at least a first edge server and a second edge server. The first edge server includes a first service processor, and the second edge server includes a second service processor. The method includes establishing a data communication connection between the first service processor and the second service processor, establishing a data communication connection between the first service processor and a specified website, establishing a trusted communication between the first service processor and the specified website, establishing a trusted communication between the first service processor and the second service processor, obtaining an activation right from the specified website by the first service processor, and performing the activation right to activate the first edge server and the second edge server by the first service processor.

Embodiments of the present disclosure provide a multi-server system, including a first edge server and a second edge server. The first edge server includes a first service processor. The second edge server includes a second service processor. The first service processor and the second service processor are mutually connected for data communication. The first service processor is mutually connected to a specified website for data communication. The first service processor established a trusted communication with the specified website. The first service processor and the second service processor establish a trusted communication therebetween. The first service processor obtains an activation right from the specified website. The first service processor performs the activation right to activate the first edge server and the second edge server.

DETAILED DESCRIPTION OF THE EMBODIMENTS

Figure 1:
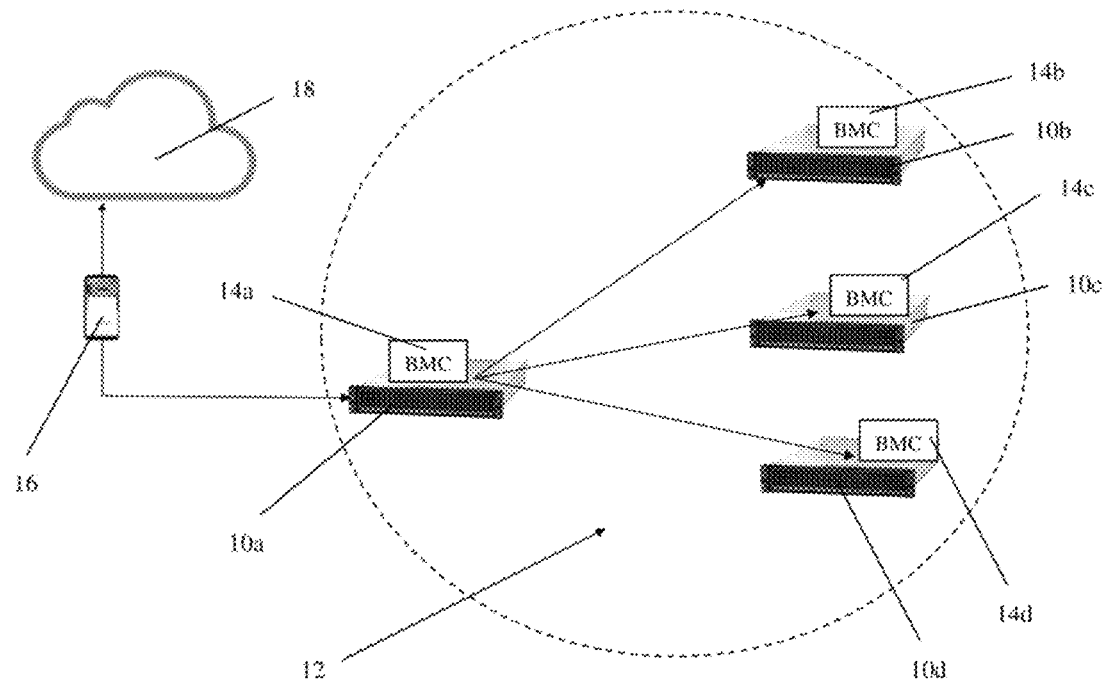
FIG. 1 illustrates a schematic diagram of a method for activating at least two edge servers according to some embodiments of the present disclosure.

FIG. 1 illustrates a schematic diagram of a method for activating at least two edge servers according to some embodiments of the present disclosure. A plurality of edge servers 10a, 10b, 10c, and 10d form a multi-server system 12. Each edge server of the plurality of edge servers 10a, 10b, 10c, and 10d includes a service processor, for example, a baseboard management controller (BMC) of a plurality of BMCs 14a, 14b, 14c, and 14d. Assume that the edge servers 10a, 10b, 10c, and 10d are not activated, the BMCs 14a, 14b, 14c, and 14d then need to be interconnected for data communication first.

If the edge servers 10a, 10b, 10c, and 10d each have a wireless network module, the BMCs 14a, 14b, 14c, and 14d can start wireless network modules to search for predefined wireless network hotspots, for example, Lenovo Edge Activation. Meanwhile, one edge server 10a is interconnected to a mobile phone 16 for data communication. The mobile phone 16 is data-communicated with a mobile network (e.g., Internet). Thus, the edge server 10a can communicate data with at least one specified website 18 (e.g., ThinkShield Portal) on the mobile network (e.g., Internet) through the mobile phone 16. Furthermore, by executing a mobile phone application 100 shown in FIG. 2 on the mobile phone 16, the edge server 10a can be connected to the specified website 18 for data communication.

In addition, if the edge server 10a includes a Long Term Evolution (LTE) hardware module connected to the BMC 14a of the edge server 10a, the edge server 10a can be also connected to a mobile cellular network for data communication through the LTE hardware module. Thus, the edge server 10a can be connected to the specified website 18 for data communication.

After the edge server 10a is connected to the specified website 18 for data communication through the mobile phone application 100, the edge server 10a can be changed into a wireless network hotspot, which can be named with a predefined name (e.g., Lenovo Edge Activation), and the password of the wireless network hotspot can be a public key of the specified website 18. Other edge servers 10b, 10c, and 10d in the same local network of the edge station can be also connected to the wireless network hotspot. Thus, the BMCs 14a, 14b, 14c, and 14d of the edge servers 10a, 10b, 10c, and 10d can be interconnected for data communication.

If the edge servers 10a, 10b, 10c, and 10d do not include a wireless network module but each includes an internal switch module, the clients/users can connect the edge servers 10*a*, 10*b*, 10*c*, and 10*d* with each other in a daisy chain form to enable data communication to allow the BMCs 14*a*, 14*b*, 14*c*, and 14*d* of the edge servers 10*a*, 10*b*, 10*c*, and 10*d* to communicate with each other.

The internal switch modules of the edge servers 10*a*, 10*b*, 10*c*, and 10*d* can be connected to the BMCs 14*a*, 14*b*, 14*c*, and 14*d* of the edge servers 10*a*, 10*b*, 10*c*, and 10*d*, respectively. A port of each internal switch module can be connected to a port of an internal switch module of a next edge server so as to mutually connect the edge servers 10*a*, 10*b*, 10*c*, and 10*d* to cause the BMCs 14*a*, 14*b*, 14*c*, and 14*d* to communicate with each other.

If the edge servers 10*a*, 10*b*, 10*c*, and 10*d* do not include a wireless network module and an internal switch module, the edge servers 10*a*, 10*b*, 10*c*, and 10*d* can be mutually connected for data communication through an external switch module. Thus, the BMCs 14*a*, 14*b*, 14*c*, and 14*d* of the edge servers 10*a*, 10*b*, 10*c*, and 10*d* can communicate with each other. The external switch module can be connected to the BMCs 14*a*, 14*b*, 14*c*, and 14*d* of the edge servers 10*a*, 10*b*, 10*c*, and 10*d*. Thus, the BMCs 14*a*, 14*b*, 14*c*, and 14*d* can communicate with each other.

After the edge servers 10*a*, 10*b*, 10*c*, and 10*d* are connected to cause the BMCs 14*a*, 14*b*, 14*c*, and 14*d* of the edge servers 10*a*, 10*b*, 10*c*, and 10*d* to communicate with each other and the edge server 10*a* to be connected to the specified website 18 for data communication, the edge server 10*a* can send an unauthenticated Representational State Transfer Application Programming Interface (REST API) to other edge servers 10*b*, 10*c*, and 10*d* in the same local network to obtain basic information of the edge servers 10*b*, 10*c*, and 10*d*, e.g., at least one of system name, machine type, or serial number, or other information.

After the BMCs 14*a*, 14*b*, 14*c*, and 14*d* of the edge servers 10*a*, 10*b*, 10*c*, and 10*d* are mutually connected, the edge server 10*a* can automatically discover the other edge servers 10*b*, 10*c*, and 10*d*. Then, the mobile phone 16 connected to the edge server 10*a* can display all the edge servers 10*a*, 10*b*, 10*c*, and 10*d*. If a certain edge server is not listed on the screen of the mobile phone 16 running the mobile phone application 100, a problem with the network connection to the edge server can be indicated. Thus, detection and correction may need to be performed.

The edge server 10*a* can send the basic information of the other edge servers 10*b*, 10*c*, and 10*d* to the mobile phone 16. The mobile phone application 100 running on the mobile phone 16 can list all the edge servers 10*a*, 10*b*, 10*c*, and 10*d* to allow the clients/users to confirm whether all the edge servers 10*a*, 10*b*, 10*c*, and 10*d* need to be activated simultaneously.

Figure 2:
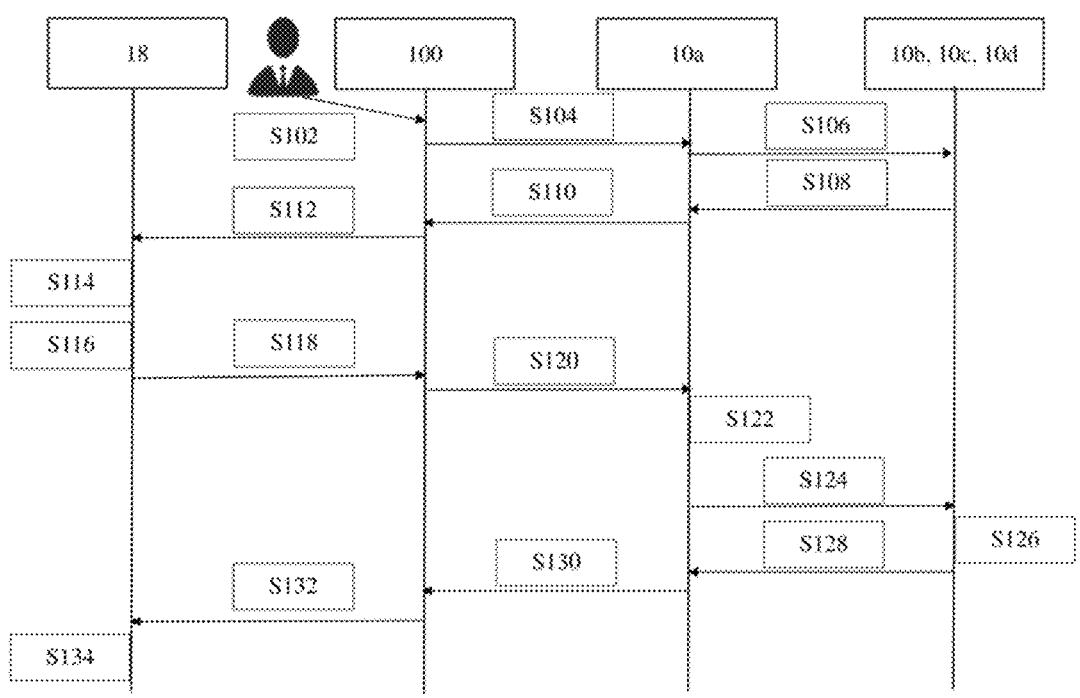
FIG. 2 illustrates a schematic diagram showing a part of a method for activating at least two edge servers according to some embodiments of the present disclosure.

As shown in FIG. 2, after the clients/users confirm that all the edge servers 10*a*, 10*b*, 10*c*, and 10*d* or some of the edge servers 10*a*, 10*b*, 10*c*, and 10*d* need to be activated simultaneously through the mobile phone application 100 running on the mobile phone 16 (S102), the mobile phone application 100 can send one or more pieces of specified basic information of the edge servers 10*a*, 10*b*, 10*c*, and 10*d* and authentication information of the BMC 14*a* to the specified website 18 to request the specified website 18 to provide tokens for the edge servers 10*a*, 10*b*, 10*c*, and 10*d*.

Although using the mobile phone 16 and the mobile phone application 100 is convenient, another method can be technically used. For example, a special-purpose device can be connected to the BMC 14*a* through an interface at a front panel of the edge server 10*a*. Meanwhile, the device can be connected to the cellular network. Then, the device can be used for activation too.

The request of the tokens to the specified website 18 is based on the cascaded connection of the one or more pieces of basic information of the edge servers 10*a*, 10*b*, 10*c*, and 10*d* and the authentication information of the BMC 14*a* (i.e., a signature for signing the basic information of the edge server 10*a* using a private key of the BMC 14*a*).

After the specified website 18 receives the request of providing the tokens, the basic information of the edge servers 10*a*, 10*b*, 10*c*, and 10*d* can be compared and verified with related information stored in an information database. If a verification result is positive, the specified website 18 can verify the authentication information of the BMC 14*a* using the private key of the BMC 14*a* stored in the website information database. If a verification result is positive, the specified website 18 can generate a token for each of the edge servers 10*a*, 10*b*, 10*c*, and 10*d*. After passing the verification process above, the BMC 14*a* can establish a trusted communication with the specified website 18.

The token can include the basic information of each of edge servers 10*a*, 10*b*, 10*c*, and 10*d* and a public key of the BMC 14*a* and can be signed using the private key of the specified website 18.

The token obtained by the BMC 14*a* from the specified website 18 can be used to establish the trusted communication between the BMC 14*a* and the BMC 14*b*, 14*c*, and 14*d* of the edge servers 10*b*, 10*c*, and 10*d*. The trust can be established based on the verification of the BMC 14*a* by the specified website 18 through the mobile phone application 100 running on the mobile phone 16. Moreover, the trust can be further established based on the token signed by the private key of the specified website 18 by the BMC 14*a* from the specified website 18. Since the edge servers 10*a*, 10*b*, 10*c*, and 10*d* store the public key of the specified website 18 after being manufactured and before transferring the edge servers 10*a*, 10*b*, 10*c*, and 10*d*, the edge servers 10*b*, 10*c*, and 10*d* can perform verification on the token to determine whether the BMC 14*a* can be trusted. Meanwhile, since the token can also store the public key of the BMC 14*a*, the edge servers 10*b*, 10*c*, and 10*d* can perform verification on the authentication of the BMC 14*a* to allow the BMC 14*a* to perform verification in subsequent steps.

By providing the token, by the BMC 14*a*, to the BMC 14*b*, 14*c*, and 14*a* of the edge servers 10*b*, 10*c*, and 10*d*, the verification result can be positive. After the trusted communication is established between the BMC 14*a* and the BMCs 14*b*, 14*c*, and 14*d* of the edge servers 10*b*, 10*c*, and 10*d*, the mobile phone application 100 can require the BMC 14*a* to provide activation request codes of the edge servers 10*a*, 10*b*, 10*c*, and 10*d*, respectively (S104).

Based on the token, the BMC 14*a* of the edge server 10*a* can require the edger servers 10*b*, 10*c*, and 10*d* to provide activation request codes of their own (S106). Based on the trust, the edge servers 10*b*, 10*c*, and 10*d* can send the activation request codes to the BMC 14*a* of the edge server 10*a*. Then, the BMC 14*a* of the edge server 10*a* can provide the activation request codes of the edge servers 10*a*, 10*b*, 10*c*, and 10*d* to the mobile phone application 100 (S110).

The mobile phone application 100 can provide the activation request codes of the edge servers 10*a*, 10*b*, 10*c*, and 10*d* to the specified website 18 and request the specified website 18 to provide corresponding activation responses (S112). The specified website 18 can first verify the activation request codes of the edge servers 10*a*, 10*b*, 10*c*, and 10*d* (S114). After obtaining the positive verification result, the specified website 18 can generate the activation responses for the edge servers 10*a*, 10*b*, 10*c*, and 10*d* (S116). Then, the specified website 18 can send the activation responses of the edge servers 10a, 10b, 10c, and 10d to the mobile phone application 100 (S118). Then, the activation responses can be sent to the edge server 10a (S120). The activation responses can represent activation rights or activation indications for the edge servers 10a, 10b, 10c, and 10d.

After receiving the activation responses of the edge servers 10a, 10b, 10c, and 10d, the BMC 14a of the edge server 10a can first verify the activation response of the edge server 10a to activate the edger server 10a (S122). Then, other activation responses can be sent to the BMCs 14b, 14c, and 14d of the edge servers 10b, 10c, and 10d. After the BMCs 14b, 14c, and 14d of the edge servers 10b, 10c, and 10d receive the corresponding activation responses and verify the activation responses, respectively, the edge servers 10b, 10c, and 10d can be activated.

After the edge servers 10b, 10c, and 10d are activated, activation results can be sent to the edge server 10a (S128). The edge server 10a can send a report of the activation results of the edge servers 10a, 10b, 10c, and 10d to the mobile phone application 100 (S130). Then, the report can be sent to the specified website 18 (S132). After receiving the activation results of the edge servers 10a, 10b, 10c, and 10d, the specified website 18 can update the activation states of the edge servers 10a, 10b, 10c, and 10d (S134).

As described above, the multi-server system 12 of the present disclosure can include the edge servers 10a, 10b, 10c, and 10d. Each edge server of the edge servers 10a, 10b, 10c, and 10d includes one BMC of the BMCs 14a, 14b, 14c, and 14d. The BMCs 14a, 14b, 14c, and 14d can be mutually connected for data communication, or at least each of the BMCs 14b,14c, and 14d can be mutually connected to the BMC 14a for data communication. The BMCs 14b, 14c, and 14d can also be mutually connected for data communication. The BMC 14a can be connected to the specified website 18 for data communication through the mobile phone application 100 running on the mobile phone 16. Based on this, the multi-server system 12 can be suitable to perform the method for activating the edge servers 10a, 10b, 10c, and 10d.

The above are only embodiments of the present disclosure. Modifications and/or changes can be made to embodiments of the present disclosure without departing from the spirit of the present disclosure. For brevity, features of embodiments of the present disclosure can be provided separately or in any suitable sub-combination.

What is claimed is:

1. A method for activating a first edge server and a second edge server, wherein the first edge server includes a first service processor, and the second edge server includes a second service processor, the method comprising:
   establishing a data communication connection between the first service processor and the second service processor;
   establishing a data communication connection between the first service processor and a specified website;
   establishing a trusted communication between the first service processor and the specified website;
   establishing a trusted communication between the first service processor and the second service processor;
   obtaining an activation right from the specified website by the first service processor; and
   executing the activation right to activate the first edge server and the second edge server by the first service processor;
   wherein:
   the first service processor requests the second service processor to provide an activation request code of the second edge server;
   the first service processor provides an activation request code of the first edge server and the activation request code of the second edge server to the specified website; and
   after the first service processor receives, from the specified website, an activation response of the first edge server and an activation response of the second edge server, the first service processor activates the first edge server and sends the activation response of the second edge server to the second service processor.

2. The method according to claim 1, wherein the first service processor is connected to the specified website for data communication through a mobile phone being able to communicate data with a mobile network.

3. The method according to claim 1, wherein establishing the trusted communication between the first service processor and the specified website includes: providing authentication information of the first service processor and at least one piece of basic information of the second edge server to the specified website by the first service processor.

4. The method according to claim 3, wherein the authentication information of the first service processor and the at least one piece of basic information of the second edge server are encrypted with a private key of the first service processor.

5. The method according to claim 3, wherein: the specified website verifies the authentication information of the first service processor and the at least one piece of basic information of the second edge server provided by the first service processor, and provides a token to the first service processor when a verification result is positive; and in establishing the trusted communication between the first service processor and the second service processor, the first service processor provides the token to the second service processor.

6. The method according to claim 1, wherein: the first edge server and the second edge server each include a wireless network module or an internal switch module; and the first service processor and the second service processor are mutually connected for data communication through the wireless network module or the internal switch module.

7. The method according to claim 1, wherein: the first edge server and the second edge server are mutually connected to an external switcher for data communication; and the first service processor and the second service processor are mutually connected for data communication through the external switcher.

8. A multi-server system comprising:
   a first edge server including a first service processor; and
   a second edge server including a second service processor;
   wherein:
   the first service processor and the second service processor are mutually connected for data communication;
   the first service processor is mutually connected to a specified website for data communication;
   the first service processor established a trusted communication with the specified website;
   the first service processor and the second service processor establish a trusted communication therebetween;

the first service processor obtains an activation right from the specified website; and the first service processor executes the activation right to activate the first edge server and the second edge server;

wherein:

the first service processor requests the second service processor to provide an activation request code of the second edge server;

the first service processor provides an activation request code of the first edge server and the activation request code of the second edge server to the specified website; and after the first service processor receives, from the specified website, an activation response of the first edge server and an activation response of the second edge server, the first service processor activates the first edge server and sends the activation response of the second edge server to the second service processor.

9. The system according to claim 8, wherein the first service processor is connected to the specified website for data communication through a mobile phone being able to communicate data with a mobile network.

10. The system according to claim 8, wherein the first service processor provides authentication information of the first service processor and at least one piece of basic information of the second edge server to the specified website.

11. The system according to claim 10, wherein the first service processor performs encryption on the authentication information of the first service processor and the at least one piece of basic information of the second edge server with a private key of the first service processor.

12. The system according to claim 10, wherein the first service processor provides a token obtained from the specified website to the second service processor.

13. The system according to claim 8, wherein: the first edge server and the second edge server each includes a wireless network module or an internal switch module, and the first edge server and the second edge server are mutually connected for data communication through the wireless network modules.

14. The system according to claim 8, wherein: the first edge server and the second edge server are mutually connected to an external switcher for data communication, and the first edge server and the second edge server are mutually connected for data communication through the external switcher.

* * * * *